(12) United States Patent
Sanguinetti

(10) Patent No.: US 11,055,922 B2
(45) Date of Patent: Jul. 6, 2021

(54) APPARATUS AND ASSOCIATED METHODS FOR VIRTUAL REALITY SCENE CAPTURE

(71) Applicant: Nokia Technologies Oy, Espoo (FI)

(72) Inventor: Alejandro Sanguinetti, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 120 days.

(21) Appl. No.: 16/468,825

(22) PCT Filed: Nov. 28, 2017

(86) PCT No.: PCT/FI2017/050834
§ 371 (c)(1),
(2) Date: Jun. 12, 2019

(87) PCT Pub. No.: WO2018/115571
PCT Pub. Date: Jun. 28, 2018

(65) Prior Publication Data
US 2019/0347863 A1 Nov. 14, 2019

(30) Foreign Application Priority Data
Dec. 20, 2016 (EP) .................................... 16205281

(51) Int. Cl.
*G06T 19/00* (2011.01)
*A63F 13/5252* (2014.01)
(Continued)

(52) U.S. Cl.
CPC ........ *G06T 19/006* (2013.01); *A63F 13/5252* (2014.09); *G06F 3/011* (2013.01);
(Continued)

(58) Field of Classification Search
CPC .. G06F 3/011; H04N 5/23238; H04N 5/3415; G06K 2009/2045; G06T 19/006; A63F 13/525; A06K 9/00671
See application file for complete search history.

(56) References Cited

U.S. PATENT DOCUMENTS 6,657,667 B1 * 12/2003 Anderson .......... H04N 5/23293
348/333.12
6,978,052 B2 12/2005 Beged-Dov et al.
(Continued)

FOREIGN PATENT DOCUMENTS

EP 1677534 7/2006
WO 2015/107257 A1 7/2015

OTHER PUBLICATIONS

"Troubleshooting", Ptgui, Retrieved on Jun. 6, 2019, Webpage available at : https://www.ptgui.com/support.html#3_22.
(Continued)

*Primary Examiner* — Kim Y Vu
*Assistant Examiner* — Molly Delaney
(74) *Attorney, Agent, or Firm* — Alston & Bird LLP

(57) ABSTRACT

A virtual reality visual indicator apparatus comprising a virtual reality image capture device comprising a plurality of cameras configured to capture a respective plurality of images of a scene, the respective plurality of images of the scene configured to be connected at stitching regions to provide a virtual reality image of the scene; and a visual indicator provider configured to transmit, into the scene, a visual indicator at a location of at least one stitching region prior to capture of the respective plurality of images of the scene and provide no visual indicator during capture of the respective plurality of images.

20 Claims, 4 Drawing Sheets

(51) Int. Cl.
*G06F 3/01* (2006.01)
*G06K 9/00* (2006.01)
*H04N 5/232* (2006.01)
*H04N 5/341* (2011.01)
*G06K 9/20* (2006.01)

(52) U.S. Cl.
CPC ..... *G06K 9/00671* (2013.01); *H04N 5/23238* (2013.01); *H04N 5/3415* (2013.01); *G06K 2009/2045* (2013.01)

(56) References Cited

U.S. PATENT DOCUMENTS

| | | | |
|---|---|---|---|
| 7,012,637 B1 | 3/2006 | Blume et al. | |
| 7,782,357 B2 | 8/2010 | Cutler | |
| 8,810,626 B2 | 8/2014 | Putraya et al. | |
| 9,908,482 B1* | 3/2018 | Falstrup | F16M 11/041 |
| 2004/0189849 A1 | 9/2004 | Hofer | |
| 2005/0151837 A1 | 7/2005 | Cutler | |
| 2007/0172151 A1* | 7/2007 | Gennetten | H04N 5/23293 382/299 |
| 2012/0154520 A1 | 6/2012 | Putraya et al. | |
| 2013/0287304 A1 | 10/2013 | Kimura | |
| 2014/0098229 A1 | 4/2014 | Lu et al. | |
| 2015/0035857 A1* | 2/2015 | Lowe | H04N 5/232935 345/629 |
| 2015/0070523 A1* | 3/2015 | Chao | H04N 5/23293 348/218.1 |
| 2015/0189266 A1* | 7/2015 | Zhou | H04N 13/25 348/54 |
| 2015/0329048 A1 | 11/2015 | Wang et al. | |
| 2016/0088280 A1 | 3/2016 | Sadi et al. | |
| 2016/0088287 A1* | 3/2016 | Sadi | H04N 13/271 348/43 |
| 2017/0006219 A1* | 1/2017 | Adsumilli | H04N 5/23219 |
| 2017/0295356 A1* | 10/2017 | Abbas | H04N 5/2251 |
| 2018/0025467 A1* | 1/2018 | Macmillan | G06T 15/20 382/190 |
| 2018/0205889 A1* | 7/2018 | Abbas | H04N 5/247 |

OTHER PUBLICATIONS

"Line Lasers", Boschtools, Retrieved on Jun. 6, 2019, Webpage available at: https://www.boschtools.com/us/en/boschtools-ocs/line-lasers-23506-c/.

Extended European Search Report received for corresponding European Patent Application No. 16205281.5, dated Jun. 22, 2017, 7 pages.

International Search Report and Written Opinion received for corresponding Patent Cooperation Treaty Application No. PCT/FI2017/050834, dated Feb. 8, 2018, 11 pages.

International Search Report and Written Opinion received for corresponding Patent Cooperation Treaty Application No. PCT/FI2017/050588, dated Dec. 20, 2017, 13 pages.

* cited by examiner

```
Using a virtual reality visual indicator apparatus comprising a virtual reality image capture device comprising a plurality of cameras configured to capture a respective plurality of images of a scene, the respective plurality of images of the scene configured to be connected at stitching regions to provide a virtual reality image of the scene, and a visual indicator provider by
```

602

```
Transmitting, using the visual indicator provider, into the scene, a visual indicator at a location of at least one stitching region prior to capture of the respective plurality of images of the scene
```

604

```
During capture of the respective plurality of images, providing no visual indicator.
```

Figure 7

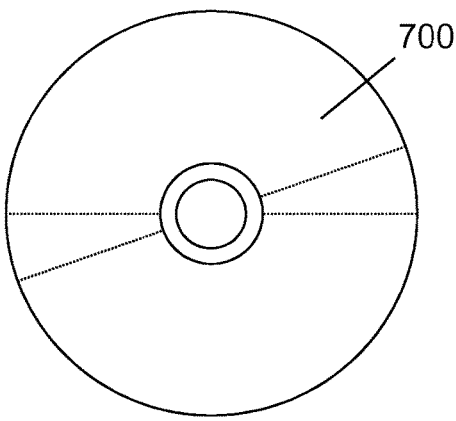

700

APPARATUS AND ASSOCIATED METHODS FOR VIRTUAL REALITY SCENE CAPTURE

RELATED APPLICATION

This application was originally filed as PCT Application No. PCT/FI2017/050834 filed Nov. 28, 2017 which claims priority benefit from EP Patent Application No. 16205281.5 filed Dec. 20, 2016.

TECHNICAL FIELD

The present disclosure relates to the field of virtual reality and, in particular, to indicating stitching regions in a scene to be captured as a series of images by a virtual reality image capture apparatus. Associated methods and computer programs are also disclosed. Certain disclosed aspects/examples relate to portable electronic devices.

BACKGROUND

Virtual reality (VR) may provide an immersive experience for a user. Post production editing of VR captured content (e.g. images and audio) can be challenging.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided a virtual reality visual indicator apparatus comprising: a virtual reality image capture device comprising a plurality of cameras configured to capture a respective plurality of images of a scene, the respective plurality of images of the scene configured to be connected at stitching regions to provide a virtual reality image of the scene; and a visual indicator provider configured to:
 transmit, into the scene, a visual indicator at a location of at least one stitching region prior to capture of the respective plurality of images of the scene; and
 provide no visual indicator during capture of the respective plurality of images.

The virtual reality image of the scene may extend over 360° in a horizontal image capture plane.

The respective plurality of images may be captured over 195° in a vertical image capture plane perpendicular to and centred about a horizontal image capture plane.

The visual indicator provider may be configured to transmit a visual indicator comprising one or more of:
 a line indicating a boundary between adjacent captured images, wherein adjacent cameras of the plurality of cameras are configured to capture the adjacent captured images meeting at the boundary; and
 an area indicating an overlap region between adjacent captured images, wherein adjacent cameras of the plurality of cameras are configured to capture the overlap region between the adjacent captured images.

The line or area may extend in one or more horizontal, vertical or other directions depending on the spatial relationship between adjacent cameras of the virtual reality image capture device.

The visual indicator provider may be configured to transmit a visual indicator indicating one or more of:
 boundary edges of the stitching region centred about a centre line of the stitching region; and
 a dimension of the stitching region with respect to the centre line of the stitching region.

One or more of the size and the position of the stitching region may be configured to be variable according to a definable variable overlap region between adjacent images.

The plurality of cameras of the virtual reality image capture device may be fixed in position relative to each other. In this case, the visual indicator provider may be configured to transmit a visual indicator indicating a change in location of the least one stitching region in response to a change in orientation of the virtual reality image capture device.

At least one of the plurality of cameras of the virtual reality image capture device may be a directionally controllable camera configured to change direction so the field of view of the directionally controllable camera is changed, and the visual indicator provider may be configured to transmit a visual indicator indicating a correspondingly changed position of the stitching region. The visual indicator provider in this case may be a directionally controllable visual indicator configured to track a change in the location of the least one stitching region in response to a change in the field of view of the directionally controllable camera.

The visual indicator provider may be configured to transmit, into the scene, one or more of:
 a horizon line normal to the gravity vector;
 an eye level line normal to the gravity vector at a predetermined eye-level height from ground level;
 one or more operating parameters of one or more cameras of the virtual reality image capture device;
 one or more of battery life, operating time and operating temperature (e.g. of the visual indicator provider and/or of the virtual reality image capture device).

The at least one stitching region may be parallel with the gravity vector in the scene. The at least one stitching region may be considered to be vertical, and may run from floor to ceiling in an indoor scene, for example. This may be the case if adjacent cameras are located in the image capture plane perpendicular to the gravity vector (i.e. horizontally).

The at least one stitching region may be normal to the gravity vector in the scene. The at least one stitching region may be considered to be horizontal. This may be the case if adjacent cameras are located perpendicularly in the image capture plane perpendicular to the gravity vector (i.e. the adjacent cameras are located in a plane parallel with the gravity vector, vertically).

The virtual reality image capture device and the visual indicator provider may each be configured to be repeatably user-fixed to each other. In some examples the virtual reality image capture device and the visual indicator provider may be part of an integral virtual reality visual indicator apparatus.

The virtual reality image capture device and the visual indicator provider may be configured to be separate from and in communication with each other to allow for transmission of, and stopping transmission of, a visual indicator into the scene. For example, the virtual reality image capture device may be mounted in the middle of a room, and the visual indicator provider may be mounted above the virtual reality image capture device on the ceiling of the room. The virtual reality image capture device may communicate to the visual indicator provider that image capture is about to commence, so that the visual indicator provider can stop transmission of the visual indicator into the scene. The virtual reality image capture device may communicate to the visual indicator provider that no image capture is taking place, so that the visual indicator provider can transmit the visual indicator into the scene.

One or more of the virtual reality image capture device and the visual indicator provider may be configured to communicate with a remote controller to allow for operation of the one or more of the virtual reality image capture device and the visual indicator provider to be performed remotely. For example, a laptop computer may be a remote controller located outside the scene to be captured. The remote apparatus may be configured to transmit commands to the virtual reality indicator apparatus to, for example, move the virtual reality image capture device, move a directionally controllable camera of the virtual reality image capture device, and control the visual indicator provider to adjust the transmission of visual indicators (e.g. the change the location and/or dimensions of transmitted visual indications of stitching regions).

The visual indicator provider may comprise a laser and a curved mirror configured to provide a line of laser light for projection onto the scene to indicate the at least one stitching region. Depending on e.g. mirror curvature, the mirror may provide a (one-dimensional) line of laser light, or a (two-dimensional) area of laser light. Other optical processing may provide hatching lines in the stitching region in some examples.

In a second example aspect there is provided a method of using a virtual reality visual indicator apparatus comprising a virtual reality image capture device comprising a plurality of cameras configured to capture a respective plurality of images of a scene, the respective plurality of images of the scene configured to be connected at stitching regions to provide a virtual reality image of the scene, and a visual indicator provider, the method comprising:
  transmitting, using the visual indicator provider, into the scene, a visual indicator at a location of at least one stitching region prior to capture of the respective plurality of images of the scene; and
  during capture of the respective plurality of images, providing no visual indicator.

In a third example aspect there is provided a computer readable medium comprising computer program code stored thereon, the computer readable medium and computer program code being configured to, when run on at least one processor, perform the method of using a virtual reality visual indicator apparatus comprising a virtual reality image capture device comprising a plurality of cameras configured to capture a respective plurality of images of a scene, the respective plurality of images of the scene configured to be connected at stitching regions to provide a virtual reality image of the scene, and a visual indicator provider, the method comprising:
  transmitting, using the visual indicator provider, into the scene, a visual indicator at a location of at least one stitching region prior to capture of the respective plurality of images of the scene; and
  providing no visual indicator during capture of the respective plurality of images.

There is also disclosed a visual indicator provider configured to be communicably coupled to a virtual reality image capture device, the virtual reality image capture device comprising a plurality of cameras configured to capture a respective plurality of images of a scene, the respective plurality of images of the scene configured to be connected at stitching regions to provide a virtual reality image of the scene, wherein the visual indicator provider is configured to:
  transmit, into the scene, a visual indicator at a location of at least one stitching region prior to capture of the respective plurality of images of the scene; and
  provide no visual indicator during capture of the respective plurality of images.

The present disclosure includes one or more corresponding aspects, examples or features in isolation or in various combinations whether or not specifically stated (including claimed) in that combination or in isolation. Corresponding means and corresponding functional units (e.g. virtual reality image capture device, visual indicator provider) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:
FIG. 6 shows a flowchart illustrating an example method;
and
  FIG. 7 shows a computer readable medium.

DESCRIPTION OF EXAMPLE ASPECTS

Virtual reality (VR) may use a VR display comprising a headset, such as glasses or goggles or virtual retinal display, or one or more display screens that surround a user to provide the user with an immersive virtual experience. A virtual reality apparatus, using the VR display, may present multimedia VR content representative of a scene to a user to simulate the user being virtually present within the scene. The virtual reality scene may replicate a real world scene to simulate the user being physically present at a real world location or the virtual reality scene may be computer generated or a combination of computer generated and real world multimedia content. The virtual reality scene may be provided by a panoramic video (such as a panoramic live broadcast or pre-recorded content), comprising a video having a wide or 360° field of view (or more, such as above and/or below a horizontally oriented field of view). The user may then be presented with a VR view of the scene and may, such as through movement of the VR display (i.e. headset), move the VR view to look around the scene. Accordingly, a three-dimensional virtual reality space may be provided in which the virtual reality content is displayed and in which the user can look around and, optionally, explore by translation through the VR space.

The VR content provided to the user may comprise live or recorded images of the real world, captured by a VR image/content capture device, for example. The VR content may provide photographic or video imagery over 360° horizontally and over 195° vertically in some examples. A VR content capture device may comprise one or more cameras and one or more (e.g. directional and/or ambient) microphones configured to capture the surrounding visual and aural scene from a point of view. An example VR content capture device is a Nokia OZO camera of Nokia Technologies Oy.

Post-processing of VR captured images can be very technically complex, require the expertise of a skilled image editing engineer, require the use of specialist post-processing software, and require significant time and money to be expended in processing the captured images to form a seamless and convincing immersive VR image.

Figure 1:
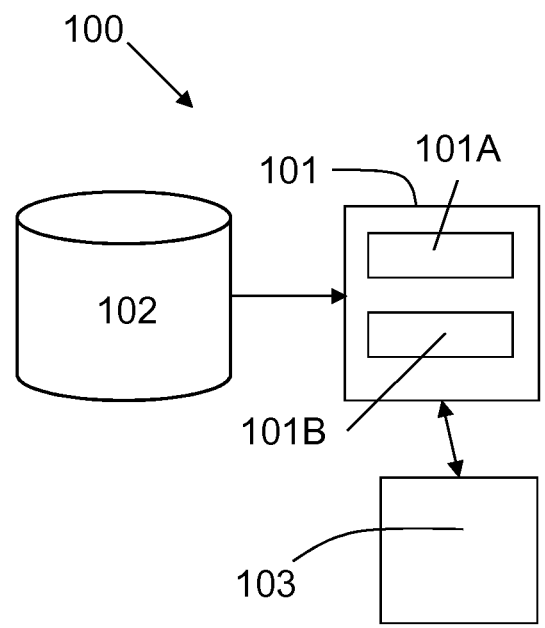
FIG. 1 illustrates an example apparatus.

With reference to FIG. 1, a VR system 100 is shown for presenting VR content to a user. A store 102 is shown representing the VR content stored in a storage medium or transiently present on a data transmission bus as the VR content is captured and received by the VR apparatus 101. Creation and processing of the VR images for storage in the store 102 is described below. The VR content may be captured by at least one VR content capture device and may be live or recorded. A user may use a VR head set 103 or other VR display to view the VR content.

In this embodiment the VR apparatus 101 may have only one processor 101A and one memory 101B but it will be appreciated that other embodiments may utilise more than one processor and/or more than one memory (e.g. same or different processor/memory types).

The processor 101A may be a general purpose processor dedicated to executing/processing information received from other components, such as the VR apparatus 101, in accordance with instructions stored in the form of computer program code on the memory. The output signalling generated by such operations of the processor is provided onwards to further components, such as to the VR apparatus 101 for display of the object image to the user via a VR head set 103, for example.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor 101A, when the program code is run on the processor. The internal connections between the memory 101B and the processor 101A can be understood to, in one or more example embodiments, provide an active coupling between the processor 101A and the memory 101B to allow the processor 101A to access the computer program code stored on the memory 101B.

In this example the processor 101A and the memory 101B are all electrically connected to one another internally to allow for electrical communication between the respective components. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
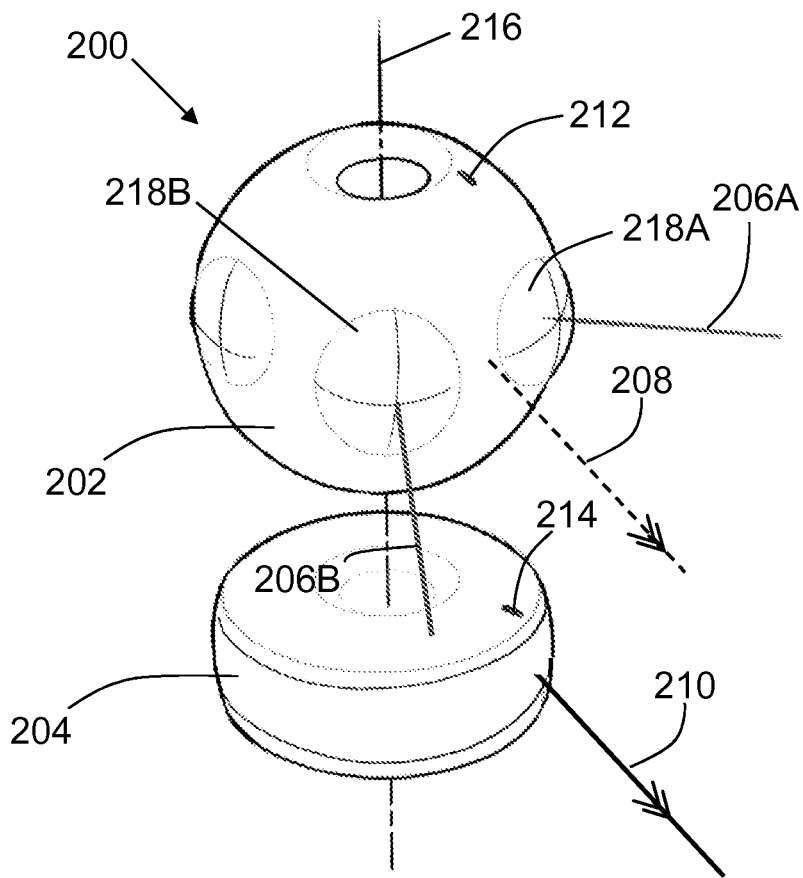
FIG. 2 shows an example virtual reality visual indicator apparatus.

FIG. 2 shows an example virtual reality visual indicator apparatus 200 comprising a virtual reality image capture device (VR-ICD) 202 and a visual indicator provider 204. The VR-ICD 202 comprises a plurality of cameras 218A, 218B configured to capture a respective plurality of images of a scene. In this example three cameras 218A, 218B are visible around the circumference (equator) of the roughly spherical VR-ICD 202. Of course in other examples other shapes of VR-ICD 202 and other camera numbers and arrangements are possible. For example, there may be one or more cameras facing up away from ground level, and/or one or more cameras facing down towards the ground. In this example, the plurality of cameras 218A, 218B of the virtual reality image capture device 200 are fixed in position relative to each other (e.g. they may be hard-mounted in the housing of the VR-ICD 202.

The centre of the field of view 206A, 206B of two adjacent cameras 218A, 218B are shown. The centre of the field of view 206A, 206B may be considered to be the direction that the camera 218A, 218B is facing. The fields of view of the cameras 218A, 218B may together capture a scene for use as a VR scene. For example, the combined fields of view of the cameras 218A, 218B around the circumference of the VR-ICD 202 may be combined to provide a 360° field of view horizontally. Each camera 218A, 218B can capture a corresponding field of view as an image of the surrounding scene. The resulting respective plurality of images from the respective cameras 218A, 218B are configured to be connected at stitching regions to provide a virtual reality image of the scene.

The visual indicator provider 204 in this example is configured to transmit a visual indicator comprising a line (in the direction of the midpoint 210 between camera fields of view 206A, 206B) indicating a boundary between adjacent captured images. The boundary is located at the stitching region in the scene where the images will be stitched together post-capture to provide the VR image. Adjacent cameras 218A, 218B of the plurality of cameras are configured to capture the adjacent captured images meeting at the boundary. While the direction 210 in FIG. 2 is shown as a radial line which would project a point onto the scene, it will be understood that the visual indication could be provided by, for example, a curved mirror spreading a point visual indicator (e.g. a laser pointer) into a vertical line. In other examples the visual indicator may be an area, as described below.

For example, two adjacent cameras may capture respective images of adjacent regions in a scene. The two images meet/overlap where each separate image has captured the same portion of the scene. This meeting/overlap region may be called the stitching region, because the two images are "stitched" together after image capture (during post-processing of the captured images) to form a composite image. FIG. 2 illustrates an example indication of where the stitching region would be located in the scene, as the midpoint 208 of the centres of the field of view 206A, 206B, of the adjacent cameras 218A, 218B. In other examples, as discussed later, the stitching region need not necessarily be centred on the midpoint 208 between the centres of the fields of view 206A, 206B.

The visual indicator provider 204 is configured to transmit, into the scene, a visual indicator 210 at a location of at least one stitching region 208 prior to capture of the respective plurality of images of the scene. The visual indicator 204 provider may transmit, for example, laser light which is visible on the walls and objects in the scene where the stitching region of captured images of the scene will be. Transmitting a visual indicator may be called projecting a visual indicator. In some example, transmitting the visual indicator may comprise casting a shadow onto the surrounding scene (e.g. by shining light past an obstruction which will cast a shadow onto the scene, thereby transmitting a visual indication, as a shadow, of the stitching region). In this example, the direction of the transmitted visual indicator 210 is parallel to the midpoint 208 between the centres of the fields of view 206A, 206B of the cameras 206A, 206B.

In this example, the VR-ICD 202 and the visual indicator provider 204 are aligned by ensuring that an alignment marker 212 of the VR-ICD 202 is aligned with (is directly above) a corresponding alignment marker 214 of the visual indicator provider 204. The visual indicator provider 204 is aligned with the VR-ICD 202 such that it will transmit a visual indicator of a stitching region between the fields of view 206A, 206B of adjacent cameras 218A, 218B of the VR-ICD 202.

Of course, while FIG. 2 shows the direction of one transmitted visual indicator 210, the visual indicator provider 204 may transmit a visual indicator for more than one, or for all, stitching regions (e.g. between the fields of view of each adjacent pair of cameras). For example, for an apparatus comprising six cameras around the circumference (each having a field of view centred in the same image capture plane), there will be six stitching regions between each pair of adjacent cameras, and the visual indicator provider 204 may provide a visual indication of each of the six stitching regions. For an apparatus 200 comprising cameras 218A, 218B which do not all have a field of view directed in the same plane, the stitching regions may be more complex than a line/band.

Providing a visual indication of a location in a scene which will be captured in a stitching region of images of the scene may help arrangement of the scene to reduce the burden of image post-processing. Stitching together images to create a VR scene image can be very technically complex and time consuming. It may be easier, quicker, and allow fora smoother transition between adjacent images in the combined VR image, if the complexity of the captured image in the stitching region is reduced.

For example, it may be more difficult to stitch together images if the stitching region contains more detailed scenery. More detailed scenery may include, for example: a moving element (e.g. an actor, a vehicle, or an object blowing in a wind such as a tree or flag), a very detailed element (e.g. an intricately patterned furnishing or a plant with many small leaves and flowers), and certain textures and visual effects (e.g. a shiny metallic surface or velvet curtain, which appears differently depending on the angle at which light hits it).

Conversely, it may be easier to stitch together images if the stitching region contains less detailed scenery. Less detailed scenery may include, for example: stationary elements (a rock, wall or solid furniture), less-detailed elements (e.g. a plain painted wall, a plain sky), and certain textures and visual effects (e.g. a matt effect painted wall, a smooth rock face).

Thus, in arranging the scene to be captured, by indicating the locations of stitching regions in the captured images, the scene may be arranged to minimise the complexity of the images in the stitching region, for example by locating actors and detailed props away from stitching regions. This facilitates post-processing of the captured images to produce a VR image of the scene.

Once the scene is arranged, the stitching regions need not be indicated any further. Therefore, the visual indicator provider 204 is also configured to provide no visual indicator during capture of the respective plurality of images. Thus, there is no need to remove any visual indicators from the images during post-processing because the visual indicators are not provided during image capture.

In some examples, at least one of the plurality of cameras 206A, 208B of the virtual reality image capture device 200 may be a directionally controllable camera. The directionally controllable camera may be configured to change direction, so the field of view of the directionally controllable camera is changed. For example one camera may be configured to tilt within the housing of the VR-ICD, for example by being mounted on a ball and socket type joint or other suitable mounting. In such a case, the visual indicator provider 204 may be configured to transmit a visual indicator indicating a correspondingly changed position of the stitching region in response to a directionally controllable camera changing direction.

For example, a directionally controllable camera (of a plurality of cameras having fields of view centred in an image capture plane) may be tilted to the left within the image capture plane. The visual indicator provider 204 would receive a signal causing the visual indicator provider to also change direction (and tilt to the left) to indicate the new position of the stitching region in relation to the moved camera. The visual indicator provider 204 may receive a signal indicating the camera movement, the movement of the stitching region, or the movement of the visual indicator provider required to indicate the new stitching region location, for example.

FIG. 2 illustrates a VR-ICD 202 and a visual indicator provider 204 which are separate from each other. In some examples, the VR-ICD 202 and the visual indicator provider 204 may be configured to be repeatably user-fixed to each other, for example, by co-mounting the VR-ICD 202 and the visual indicator provider 204 on a common mount (e.g. a tripod). The VR-ICD 202 and a visual indicator provider 204 may be aligned with each other for co-mounting by, for example, having aligned screw-holes through which a common screw may be passed for fixing both the VR-ICD 202 and the visual indicator provider 204 to a mount. As another example, there may be a magnetic alignment system so that the VR-ICD 202 and the visual indicator provider 204 can be aligned with each other when being fixed together. Being aligned with each other may mean that the visual indicator provider 204 will transmit a visual indication at the centre of two overlapping fields of view of adjacent cameras of the VR-ICD 202. In some examples, the VR-ICD 202 and the visual indicator provider 204 may be permanently fixed to each other, as component parts of a single integral VR visual indicator apparatus 200.

In some examples the VR-ICD 202 and the visual indicator provider 204 may be configured to be separate from and in communication with each other. For example, the VR-ICD 202 may be mounted on a tripod in a scene, and the visual indicator provider 204 may be mounted on a ceiling above the VR-ICD 202 (or be located on the floor beneath the VR-ICD 202), for example. In such examples, for example, the visual indicator provider 204 may comprise a memory which stores information on the location(s) of the stitching region(s) and/or visual indicator provider 204 may be configured to communicate with the VR-ICD 202 to receive the locations(s) of the stitching region(s) and/or be configured to be controllable by the VR-ICD 202 to transmit and stop transmitting the visual indicator into the scene according to image capture.

In certain embodiments, particularly if the VR-ICD 202 and the visual indicator provider 204 are not fixed to one another but are separate to and in communication with one another, the visual indicator provider 204 may be controlled (by communication with the VR-ICD 202) by, for example, one or more motors to move the position the transmitted visual indicator(s) to align to the position of the stitching region(s). Thus, as the VR-ICD 202 stitching region(s) are adjusted in the scene with the movement of the VR-ICD 202, this information is communicated to the visual indicator provider 204 so that the visual indicator provider 204 can accurately reflect the new position(s) of the stitching region (s). In such embodiments, advantageous use of a calibration step to align the respective reference positions of the VR-ICD 202 and visual indicator provider 204 (so that the stitching region(s) can be subsequently accurately indicated) would be useful.

Whether the VR-ICD 202 and visual indicator provider 204 are fixed together or not, communication between the VR-ICD 202 and the visual indicator provider 204 may take place to, for example, cause movement of the visual indicator provider 204 if the VR-ICD 202 or one or more cameras of the VR-ICD 202 moves (and thus changes the locations of the scene which will be captured in stitching regions). For example, the VR-ICD 202 and visual indicator provider 204 may be fixed together by both being individually rotatably mounted on a common tripod. The VR-ICD 202 and visual indicator provider 204 may be fixed together such than they are not movable with respect to one another (e.g. by being fixedly mounted in a common housing) but one or more cameras of the VR-ICD may be independently movable. In an example of the VR-ICD 202 and visual indicator provider 204 being fixedly connected to each other and no independent camera movement is possible, then there may not be communication relating to the movement of the VR-ICD 202 in relation to the visual indicator provider 204 as one cannot move without the other.

Communication may also take place in relation to the visual indicator provider 204 being instructed to start and stop transmitting a visual indicator of the stitching region. For example, just prior to commencing image capture, a signal may be transmitted by the VR-ICD 202 or by a remote controller to instruct the visual indicator provider 204 to stop transmission of the visual indicator into the scene. Similarly, just after image capture, and/or before commencing image capture, a signal may be transmitted by the VR-ICD 202 or by a remote controller to instruct the visual indicator provider 204 to (re)commence transmission of the visual indicator into the scene. The communication to start and/or stop transmission may be automatic. For example, is a command is sent to the VR-ICD to start capturing images, the VR-ICR may react by first communicating with the visual indicator provider to stop transmitting the visual indicator into the scene prior to capturing images of the scene.

In some examples, there may be a manual on/off switch which is used to switch the visual indicator provider on and off (i.e. to transmit, and stop transmission of, a visual indicator into the scene). In some examples there may be communication between the VR-ICD and the visual indicator provider to automatically, for example, transmit a visual indicator when the VR-ICD is not recording images, and to stop transmitting a visual indicator when the VR-ICD is capturing images of the scene.

In some examples the position and operation (e.g. on/off) of the VR-ICD 202 and/or the visual indicator provider 204 may be set and adjusted manually by a user (e.g. physically moving and fixing the VR-ICD 202 and/or the visual indicator provider 204 into place). In some examples the position of the VR-ICD 202 and/or the visual indicator provider 204 may be set and adjusted remotely, for example by a user operating a remote apparatus (e.g. a portable electronic device) in communication with the VR-ICD 202 and/or the visual indicator provider 204. The VR-ICD 202 and/or the visual indicator provider 204 may therefore comprise one or more motors or other movement elements configured to adjust their respective positions. The VR-ICD 202 and/or the visual indicator provider 204 may therefore comprise one or more on/off switches, configured to operate in response to commands transmitted from a remote apparatus.

Figure 3:
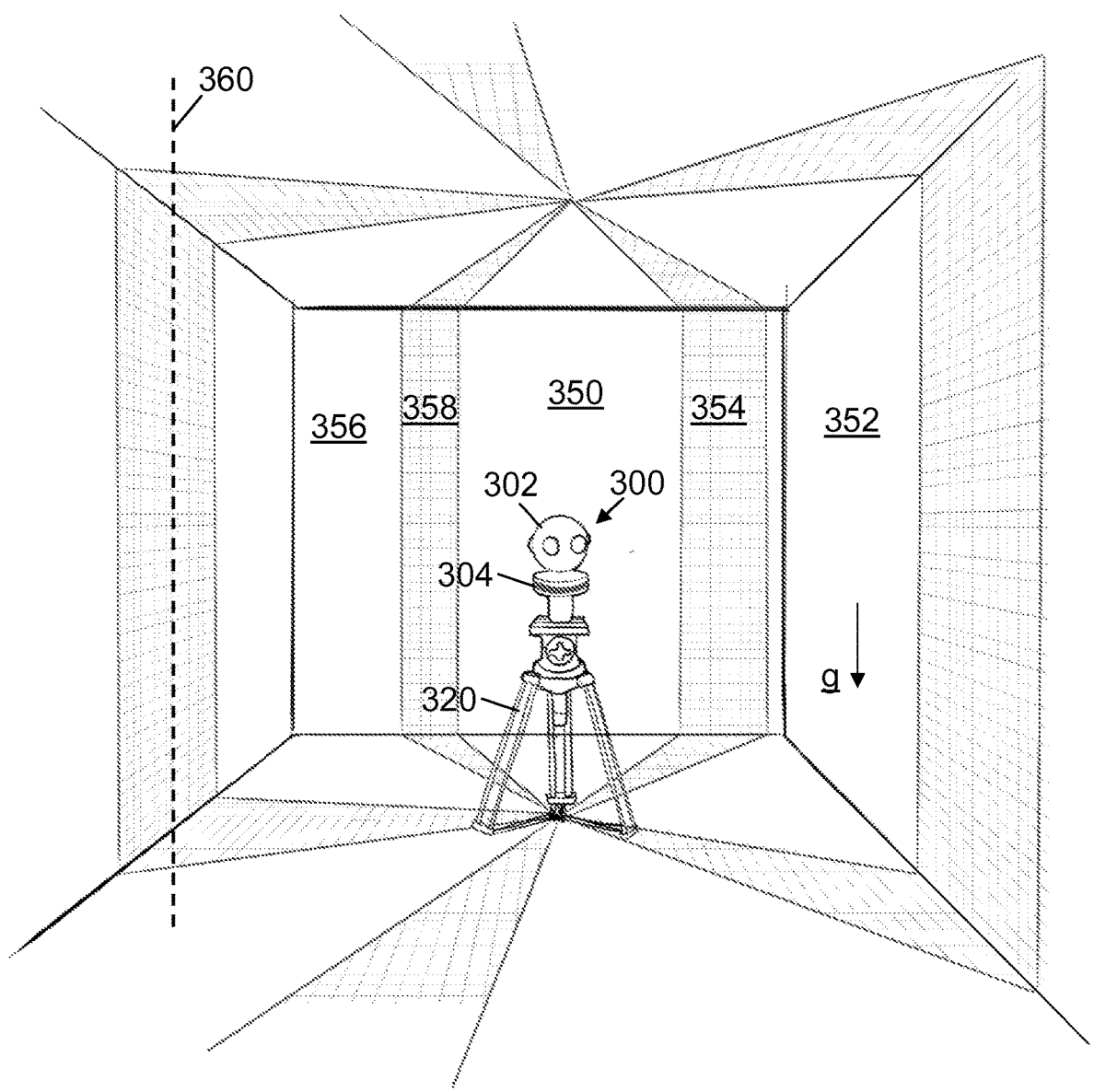
FIG. 3 shows an example virtual reality visual indicator apparatus in use.

FIG. 3 shows an example virtual reality visual indicator apparatus 300 in use. The scene illustrated in FIG. 3 is an idealised case of the scene being a cuboid room with flat walls/faces at 90° to each other for ease of illustration. The virtual reality visual indicator apparatus 300 comprises a VR-ICD 302 and visual indicator provider 304 and in this example the apparatus 300 is mounted on a tripod 320 in a room scene to be captured as a VR image.

In this example, the VR-ICD 302 comprises five cameras having fields of view 350, 352, 356 centred in a horizontal image capture plane parallel to ground level (perpendicular to the gravity vector g). The virtual reality image of the scene thus extends over 360° in a horizontal image capture plane. The images captured by the respective cameras each cover a particular angular range within the horizontal image capture plane. The camera fields of view 350, 352, 356 meet/overlap in vertical stitching regions 354, 358 between the fields of view 350, 352, 356. The adjacent fields of view denoted 350, 356 meet at a vertical stitching region denoted 358, and the adjacent fields of view denoted 350, 352 meet at a vertical stitching region denoted 354.

In this example, the respective plurality of images may be captured over 195° in a vertical image capture plane perpendicular to and centred about a horizontal image capture plane. In this way a $4\pi$ sr solid angle (i.e. all the scene) may be captured by the cameras of the VR-ICD 302. In other examples the vertical angular range of the cameras may be greater, or smaller, than 195°. In some examples the full scene may be captured by using one or more cameras facing above and/or below a horizontal image capture plane.

In this example, as shown, the visual indicator provider 304 is configured to transmit a visual indicator 354, 358 comprising a plurality of areas, each indicating an overlap region 354, 358 between adjacent captured images 350, 352, 356. Adjacent cameras of the plurality of cameras are configured to capture the overlap region 354, 358 between the adjacent captured images. Each stitching region area 354, 358 on the flat vertical walls of the idealised scene in FIG. 3 forms a rectangle extending from floor level to ceiling level. The stitching regions 354, 358 in this example run parallel with the gravity vector in the scene. On the ground and on the ceiling the stitching region area 354, 358 forms a triangle having a base at the joining edge with the wall the width of the area indicated on the wall, and an apex opposite the triangle base at a point directly above/below the apparatus 300. Each stitching region area 354, 348 has a centre line 360, in this example running vertically (parallel to the gravity vector) through the centre of each indicated stitching region location.

Thus, in setting up the scene for image capture, complex elements (e.g. actors, detailed scenery, moving elements) may be located away from the stitching region locations 354, 358 indicated by the visual indicator provider 304.

Figure 4:
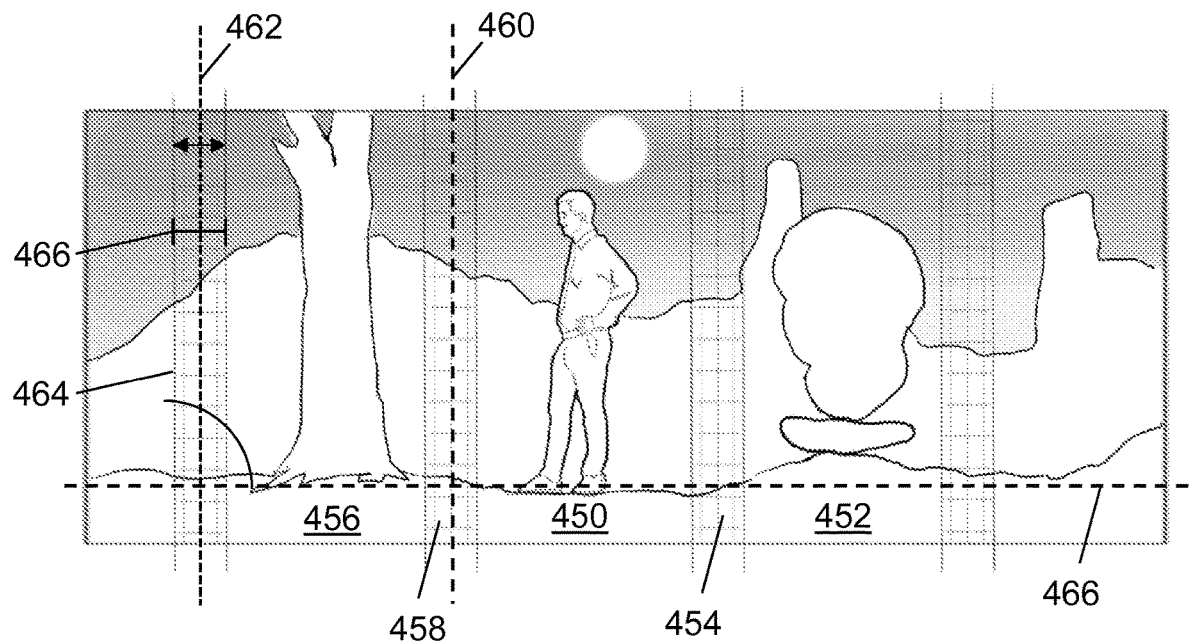
FIG. 4 shows a virtual reality scene including stitching regions.

FIG. 4 shows a virtual reality scene including stitching regions 454, 458. The scene may be that captured from the arrangement shown in FIG. 3, for example. The VR image of the scene in this example extends over 360° in a horizontal image capture plane. That is, the left edge of the figure wraps around to join with the right edge of the figure to form a VR image. In this example, elements have been positioned in the scene away from the stitching area locations 454, 458. For example, a tree is located in the field of view 456, an actor is located in the field of view 450, and a boulder arrangement is located in the field of view 452, all away from the stitching regions 454, 458 between the fields of view 450, 452, 456.

In this example, a horizon line 466 normal to the gravity vector is also indicated. It may be useful to have the horizon line indicated in the scene to check that the VR-ICD is set up with the image capture plane horizontal (in a similar way to using a spirit level to check the VR-ICD is level/horizontal).

In some examples, the visual indicator provided may transmit an eye level line normal to the gravity vector at a predetermined height from ground level. The predetermined height may be, for example, the average eye level height of an adult male. This indication may aid in positioning elements in the scene to be at the eye level of a viewer of the captured scene in a VR setting. An example predetermined height may be 160 cm from ground level.

The visual indicator provider in this example is configured to transmit a visual indicator indicating the boundary edges 464 of the stitching region centred about a centre line 462 of the stitching region. In some examples the stitching region location may be indicated by an indication of the boundary lines 464 of the stitching region. In some examples the area between the boundary lines 464 within the stitching region may be "filled in", for example by projected hatching lines or other visual indication of the region being the location of a stitching region. The visual indicator provider in this example is also configured to transmit a visual indicator indicating a dimension 466 of the stitching region with respect to the centre line of the stitching region. In other words, the width 466 of the stitching region location is indicated as the separation of the boundary lines 464 marking the stitching region. In some examples, the dimension of the stitching region may be indicated as an indication of a distance away from a centre line of the stitching region (for example, an arrow at eye level from the centre line to an outer edge of the stitching region). The "centre" line may not be in the centre of the stitching region in some examples, and if offset from the centre of the stitching region, the visual indication may comprise, for example, a centre line along the stitching region with an arrow pointing to one side of a length of 30 cm, and another arrow pointing to the opposite side of a length of 50 cm (for an 80 cm wide stitching region having a centre line offset by 10 cm to one side).

One or more the size and the position of the stitching region may be configured to be variable according to a definable variable overlap region between adjacent images. The definable variable overlap region between adjacent images may be defined as the region of the scene which is common to the fields of view of a plurality of cameras and thus may be captured in adjacent overlapping images captured by the cameras. It may be considered variable because, for example, the VR-ICD may change position and/or one or more cameras of the VR-ICD may be individually directionally controllable. The overlap region may be defined by the shared scene regions captured in a plurality of adjacent images. In some examples, it may be possible to "tune", or alter (i.e. vary), the stitching regions. It may be desirable to change the location and/or size of a stitching region, and therefore be useful to be able to indicate the changed location/size in the scene.

For example, as a default, a 10% portion at each vertical edge of a region to be captured in an image may be indicated as lying within a stitching region, because this is the portion of the scene which will be captured in adjacent overlapping images. For example, for an image capture region 1 m wide, the areas within 10 cm from the vertical edges of the image capture region may be included as stitching regions. In the example, as a default, the whole overlap between adjacent images is assumed to be the stitching region.

However, if it is desired for the scene close to a stitching region to include more complex elements which cause image stitching to be more challenging, it may be useful to indicate if it is possible to have a smaller stitching region in that scene region, or whether a smaller stitching region is not possible and it would be better to re-design the scene to avoid putting the more complex elements in that location. For example, it may be possible to have a narrower stitching region, and/or shift the centre line of a narrower stitching region within a default stitching region area, and still be able to stitch the adjacent images together as well as avoid capturing the complex elements in the stitching region. If a smaller stitching region is desired, it may thus be possible to define that the stitching region is a particular sub-portion of the overlap region. Thus the overlap region between adjacent images captured by cameras of the VR-ICD may be adjustable within a predetermined tolerance (e.g. within the image overlap). As another example, there may be an object in the left of the overlap region. It may be desirable to avoid having the object in the stitching region. Rather than moving the object, it may be possible to define that the stitching region does not include the region where the object is located, but still covers an area which is present in the overlap region (and thus in the fields of view of both cameras).

The visual indicator provider may be configured to transmit a visual indicator indicating a stitching region which has variable size and/or position according to a definable variable overlap region between adjacent images. The visual indicator provider may be configured to provide an indication of a stitching region which can be translated within the definable variable overlap region, and/or which can be varied in size within the definable variable overlap region. The visual indicator provider may be directionally controllable to achieve this.

The visual indicator provider may be controlled, for example, by receiving commands from a remote apparatus, such as a laptop computer which can run software allowing the stitching regions to be visualised on screen (for example providing an image such as that shown in FIG. 4). In some examples the stitching regions may be shown on the screen, adjusted at the remote apparatus, and as a consequence a command is sent to the visual indicator provider to adjust the transmission of a visual indicator to show the adjusted stitching region in the scene.

It may be useful to indicate other elements using the virtual indication provider. For example, the visual indicator provider may be configured to transmit, into the scene, one or more operating parameters of one or more cameras of the virtual reality image capture device (for example, the current light levels, focal points, zoom levels, aperture size, shutter speed, colour balance etc.

Figure 5:
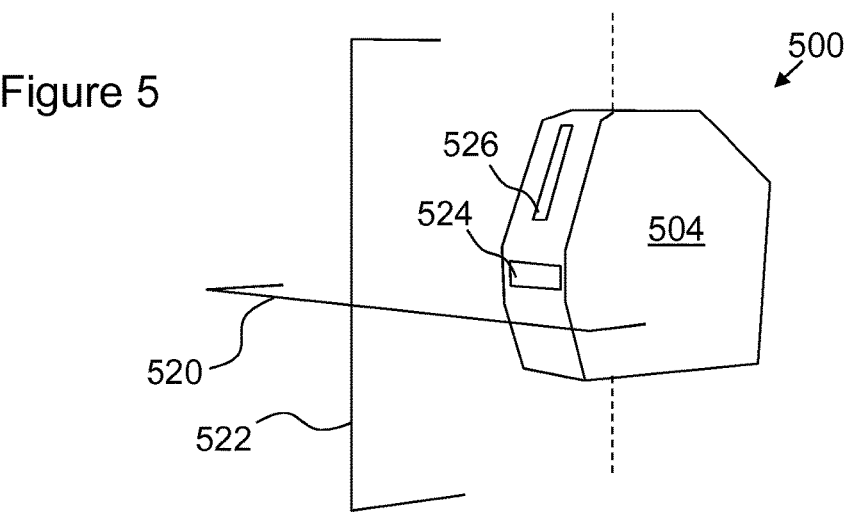
FIG. 5 shows an example visual indicator provider.

FIG. 5 illustrates an example visual indicator provider 504, which in this example is configured to provide a vertical stitching region location 522 using a vertical light projector 526, and a horizontal stitching region location 520 using a horizontal light projector 524. The visual indicator provider may comprise, for example, a laser and a curved mirror configured to provide a line of laser light for projection onto the scene to indicate the at least one stitching region.

An example laser projector may comprise a gyroscope, plumb line, spirit level, or other means to determine a horizontal alignment of the visual indicator provider 504

(and also of the VR-ICD if connected to the visual indicator provider 504). The visual indicator provider 504 may be able to indicate a horizontal alignment within a tolerance of ±1°, ±2°, ±3°, ±4° or ±5°, for example. The visual indicator provider 504 may be able to indicate a stitching region location (e.g. a stitching region boundary) in a scene to an accuracy of up to 3 mm at a distance of 10 m from the visual indicator provider 504, for example. An example laser projector may have a visible range of up to 20 m, 30, 40 m or 50 m.

FIG. 6 shows a flow diagram illustrating an example method 600 of using a virtual reality visual indicator apparatus comprising a virtual reality image capture device comprising a plurality of cameras configured to capture a respective plurality of images of a scene, the respective plurality of images of the scene configured to be connected at stitching regions to provide a virtual reality image of the scene, and a visual indicator provider. The method 600 comprises transmitting, using the visual indicator provider, into the scene, a visual indicator at a location of at least one stitching region prior to capture of the respective plurality of images of the scene 602; and during capture of the respective plurality of images, providing no visual indicator 604.

FIG. 7 illustrates schematically a computer/processor readable medium 700 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one or more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:
1. A visual indicator provider device comprising:
a processor configured to:

communicably couple the visual indicator provider device to a virtual reality image capture device including a plurality of cameras for capturing an image of a real scene; and, transmit, into the real scene, a visual indicator to indicate a location of at least one stitching region prior to the capture of a respective plurality of images by the respective plurality of cameras;

and, to stop transmitting the visual indicator into the real scene during capture of the respective plurality of images by the respective plurality of cameras.

2. The visual indicator provider device of claim 1, wherein the processor is further configured to transmit, into the real scene, a visual indicator comprising one or more of:
a line indicating a boundary between adjacent captured images, wherein adjacent cameras of the plurality of cameras are configured to capture the adjacent captured images meeting at the boundary; or
an area indicating an overlap region between adjacent captured images, wherein adjacent cameras of the plurality of cameras are configured to capture the overlap region between the adjacent captured images.

3. The visual indicator provider device of claim 1, wherein the processor is further configured to transmit, into the real scene, a visual indicator to indicate one or more of: boundary edges of the stitching region centered about a center line of the stitching region; or a dimension of the stitching region with respect to the center line of the stitching region.

4. The visual indicator provider device of claim 1, wherein the processor is further configured to vary one or more of the size and the position of the stitching region according to a definable variable overlap region between adjacent images.

5. The visual indicator provider device of claim 1, wherein the processor is further configured to transmit, into the real scene, one or more of:
a horizon line normal to the gravity vector;
an eye level line normal to the gravity vector at a predetermined height from ground level; one or more operating parameters of one or more cameras of the virtual reality image capture device; or
one or more of battery life, operating time and operating temperature.

6. The visual indicator provider device of claim 1, wherein the at least one stitching region is parallel with the gravity vector in the scene.

7. The visual indicator provider device of claim 1, further comprising a laser and a curved mirror, and wherein the processor is further configured to project at least one line of laser light onto the real scene to indicate the at least one stitching region.

8. A virtual reality apparatus comprising:
a virtual reality image capture device including a plurality of cameras; the virtual reality image capture device being configured to capture a respective plurality of images of a real scene using the respective plurality of cameras, and to connect, using one or more stitching regions, the respective plurality of images into a virtual reality image of the real scene; and,
a visual indicator provider device comprising a processor configured to: transmit, into the real scene, a visual indicator to indicate a location of at least one stitching region prior to the capture of the respective plurality of images captured by the respective plurality of cameras; and
to stop transmitting the visual indicator into the real scene during capture of the respective plurality of images by the respective plurality of cameras.

9. The virtual reality apparatus of claim 8, wherein the plurality of cameras of the virtual reality image capture device are fixed in position relative to each other.

10. The virtual reality apparatus of claim 8, wherein at least one of the plurality of cameras of the virtual reality image capture device is a directionally controllable camera configured to change direction so the field of view of the directionally controllable camera is changed, and wherein the processor is further configured to transmit a visual indicator indicating a correspondingly changed position of the stitching region.

11. The virtual reality apparatus of claim 8, wherein the virtual reality image capture device and the visual indicator provider device are configured to be repeatably user-fixed to each other.

12. The virtual reality apparatus of claim 8, wherein the virtual reality image capture device and the visual indicator provider device are configured to be separate from and in communication with each other to allow for the transmission of, and stopping transmission of, the visual indicator into the real scene.

13. The virtual reality apparatus of claim 8, wherein one or more of the virtual reality image capture device or the visual indicator provider device are configured to communicate with a remote controller to allow for operation of the one or more of the virtual reality image capture device or the visual indicator provider device to be performed remotely.

14. The virtual reality apparatus of claim 8, wherein is the processor is further configured to transmit, into the real scene, a visual indicator comprising one or more of:
a line indicating a boundary between adjacent captured images, wherein adjacent cameras of the plurality of cameras are configured to capture the adjacent captured images meeting at the boundary; or
an area indicating an overlap region between adjacent captured images, wherein adjacent cameras of the plurality of cameras are configured to capture the overlap region between the adjacent captured images.

15. The virtual reality apparatus of claim 8, wherein the processor is further configured to transmit, into the real scene, a visual indicator to indicate one or more of:
boundary edges of the stitching region centered about a center line of the stitching region;
or a dimension of the stitching region with respect to the center line of the stitching region.

16. The virtual reality apparatus of claim 8, wherein the processor is further configured to vary one or more of the size and the position of the stitching region according to a definable variable overlap region between adjacent images.

17. The virtual reality apparatus of claim 8, wherein the processor is further configured to transmit, into the real scene, one or more of:
a horizon line normal to the gravity vector;
an eye level line normal to the gravity vector at a predetermined height from ground level; one or more operating parameters of one or more cameras of the virtual reality image capture device; or
one or more of battery life, operating time and operating temperature.

18. The virtual reality apparatus of claim 8, wherein the at least one stitching region is parallel with the gravity vector in the real scene.

19. The virtual reality apparatus of claim 8, wherein the visual indicator provider device comprises a laser and a curved mirror and wherein the processor is further configured to project at least one line of laser light onto the real scene to indicate the at least one stitching region.

20. A non-transitory computer readable medium comprising program instructions stored thereon for performing at least the following:
communicably coupling a visual indicator provider device to a virtual reality image capture device including a plurality of cameras for capturing an image of a real scene;
transmitting, into the real scene, a visual indicator to indicate a location of at least one stitching region prior to the capture of a respective plurality of images by the respective plurality of cameras; and
stopping transmission of the visual indicator into the real scene during capture of the respective plurality of images by the respective plurality of cameras.

* * * * *